(12) United States Patent
Wakazono et al.

(10) Patent No.: US 8,223,440 B2
(45) Date of Patent: Jul. 17, 2012

(54) ZOOM LENS SYSTEM AND IMAGE PICKUP APPARATUS INCLUDING THE SAME

(75) Inventors: Tsuyoshi Wakazono, Utsunomiya (JP); Masao Hori, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 184 days.

(21) Appl. No.: 12/848,329

(22) Filed: Aug. 2, 2010

(65) Prior Publication Data

US 2011/0037878 A1 Feb. 17, 2011

(30) Foreign Application Priority Data

Aug. 17, 2009 (JP) .................................. 2009-188463

(51) Int. Cl.
*G02B 15/14* (2006.01)
(52) U.S. Cl. ........................................ 359/686; 359/676
(58) Field of Classification Search .................. 359/676, 359/683, 684, 686–690
See application file for complete search history.

(56) References Cited

U.S. PATENT DOCUMENTS

| | | | |
|---|---|---|---|
| 5,808,809 A | 9/1998 | Yahagi | |
| 6,141,157 A | 10/2000 | Nurishi et al. | |
| 6,825,990 B2 | 11/2004 | Yoshimi et al. | |
| 2011/0037880 A1* | 2/2011 | Sakamoto | 348/240.3 |
| 2011/0038056 A1* | 2/2011 | Nakamura | 359/688 |

OTHER PUBLICATIONS

Extended European Search Report issued in corresponding European Patent Application No. 10172365.8 dated Nov. 19, 2010.
Warren, J. Smith. "Modern lens designs," Jan. 1, 1992, Mc-Graw-Hill, XP002603812, pp. 72-75.
Shannon, Robert J. "The art and science of optical design," Jan. 1, 1997, Cambridge Univeristy Press, Cambridge, XP0026038313, pp. 178-191.
Schott, AG. "Optischer Glaskatolog-Datenblatter", Oct. 2010, SHOTT, Mainz, XP002603814, pp. 4, 54, 119.

* cited by examiner

*Primary Examiner* — Darryl J Collins
(74) *Attorney, Agent, or Firm* — Rossi, Kimms & McDowell LLP

(57) ABSTRACT

A zoom lens including in order from an object side to an image side: a positive first lens unit which does not move for zooming; a negative second lens unit for magnification, and a rear lens group including two or more lens units, in which: the first lens unit includes a first subunit not moving for focusing and a second subunit moving for focusing, and the first subunit includes two or more negative lenses and one or more positive lenses; and an average Abbe number and an average partial dispersion ratio of materials of the negative lenses included in the first subunit, average Abbe number and average partial dispersion ratio of materials of the one or more positive lenses included in the first lens unit, combined focal length of the negative lenses included in the first subunit, and focal length of the zoom lens at telephoto end are appropriately set.

8 Claims, 10 Drawing Sheets

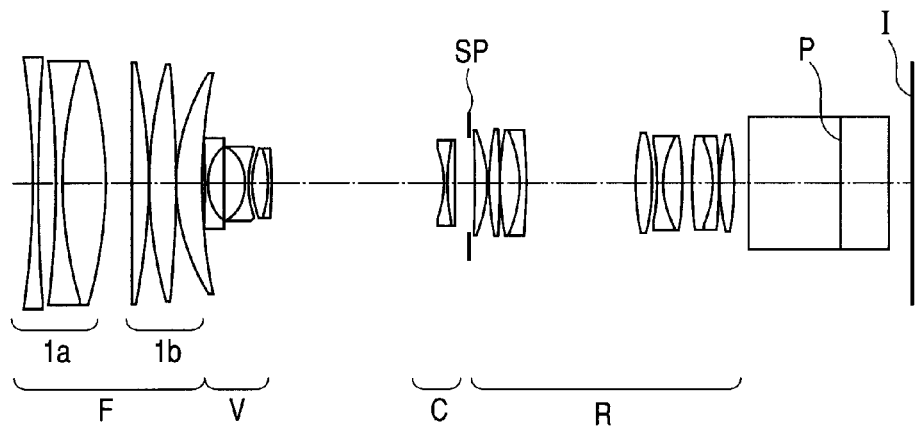
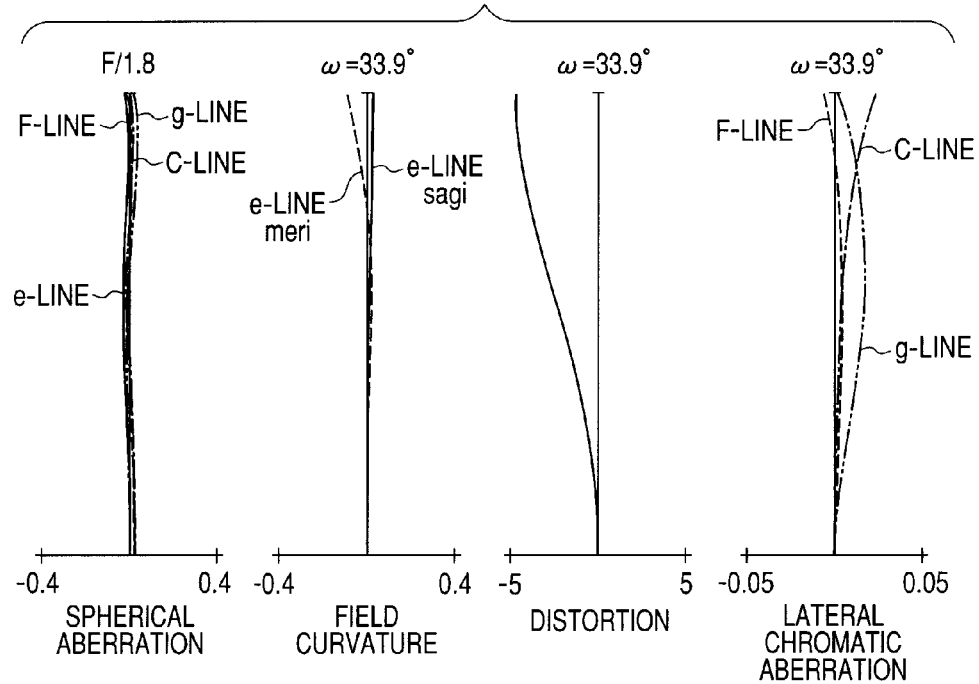

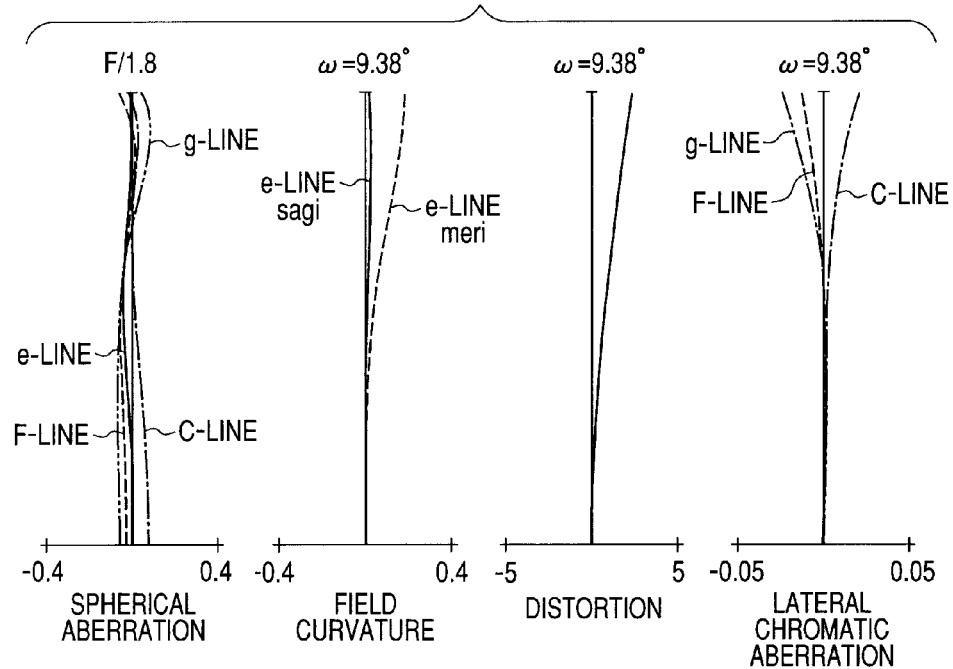
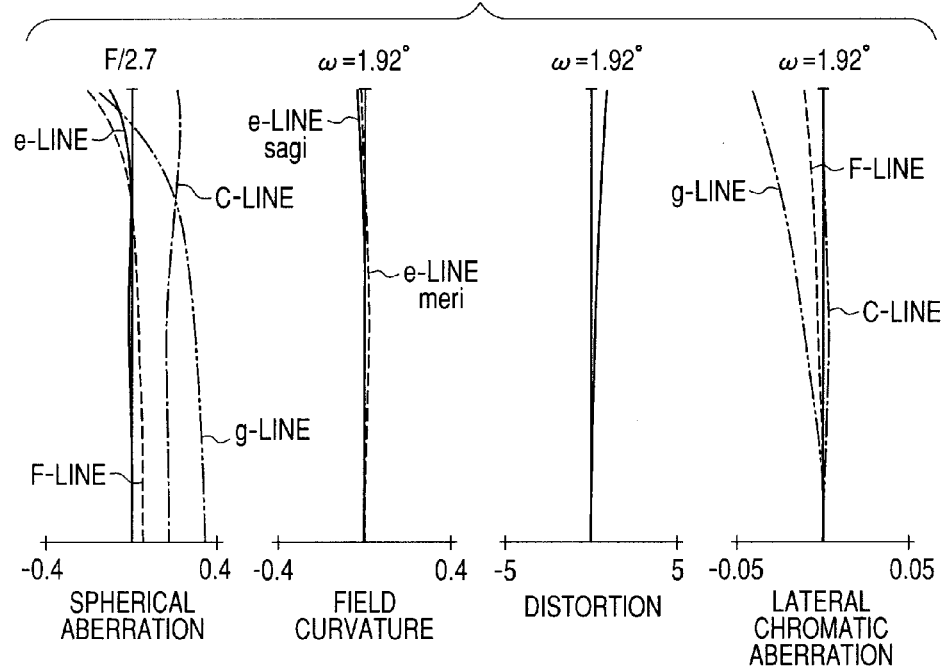

ZOOM LENS SYSTEM AND IMAGE PICKUP APPARATUS INCLUDING THE SAME

BACKGROUND OF THE INVENTION

1. Field of the Invention

The present invention relates to a zoom lens system which is suitable for use in a broadcasting television (TV) camera, a video camera, a digital still camera, and a silver-halide camera, and also to an image pickup apparatus including the zoom lens.

2. Description of the Related Art

In recent years, there have been demanded a zoom lens system having a high zoom ratio and high optical performance for image pickup apparatus such as a television (TV) camera, a silver-halide camera, a digital camera, and a video camera. A positive lead and telephoto type four-unit zoom lens system in which four lens units are provided in total and one of the lens units located closest to an object side has a positive refractive power has been known as the zoom lens system having a high zoom ratio. For instance, there is known a four-unit zoom lens system which includes a first lens unit having a positive refractive power for focusing, a second lens unit having a negative refractive power for magnification, a third lens unit having a negative refractive power for correcting image plane variation, and a fourth lens unit having a positive refractive power for image formation. As to this four-unit zoom lens system, there is known a four-unit zoom lens system in which an optical material having an extraordinary dispersion characteristic is used, so that chromatic aberration is corrected appropriately and a high optical performance is provided (see U.S. Pat. Nos. 6,825,990 and 6,141,157).

U.S. Pat. No. 6,825,990 discloses a structure in which a first sub lens unit which is fixed during focusing in a first lens unit which is fixed during zooming includes two negative lenses. As to the two negative lenses, a low dispersion material is used as a material of the negative lens disposed on the side closest to an object, so that lateral chromatic aberration is corrected appropriately mainly at the wide angle end. U.S. Pat. No. 6,141,157 discloses a structure in which a thin resin layer having a meniscus shape and a negative refractive power is formed on a lens surface of a second or third positive lens counted from the object side in a first lens unit which is fixed during zooming. Utilizing this resin layer, higher order lateral chromatic aberration is corrected appropriately mainly on the wide angle side without an increase in size or weight.

A positive lead type four-unit zoom lens system having a structure described above may support a high zoom ratio relatively easily. In order to obtain high optical performance in this four-unit zoom lens system, it is important to correct lateral chromatic aberration at the wide angle end and longitudinal chromatic aberration at the telephoto end appropriately. It is easy to correct the chromatic aberration appropriately including the lateral chromatic aberration and the longitudinal chromatic aberration if an optical material having an extraordinary dispersion characteristic is used. However, it is difficult to correct the chromatic aberration appropriately by simply using a lens made of the optical material having an extraordinary dispersion characteristic. In particular, in order to obtain high optical performance over the entire zoom range in the four-unit zoom lens system described above, it is an important factor to set appropriately a material of each lens included in the first lens unit which does not move for zooming. For instance, in order to correct a secondary spectrum of the longitudinal chromatic aberration appropriately on the telephoto side, it is important to set an appropriate difference between dispersions of materials of the positive lens and the negative lens in the first lens unit. If this difference is set inappropriately, it is difficult to suppress higher order aberration mainly.

SUMMARY OF THE INVENTION

A zoom lens system according to the present invention includes in order of from an object side to an image side: a first lens unit (F) having a positive refractive power, which does not move for zooming; a second lens unit (V, V1) having a negative refractive power for a magnification action; and a rear lens group including two or more lens units, characterized in that: the first lens unit (F) includes a first sub lens unit (1a) which does not move for focusing and a second sub lens unit (1b) which moves for focusing, and the first sub lens unit includes two or more negative lenses and one or more positive lenses; and the following conditional expressions are relative, $$-1.193 \times 10^{-3} < (\theta pa - \theta na)/(\nu pa - \nu na) < -0.904 \times 10^{-3};$$

$$40 < \nu pa - \nu na < 55; \text{ and}$$

$$-0.465 < f1ns/ft,$$

where $\nu na$ and $\theta na$ represent an average Abbe number and an average partial dispersion ratio of materials of the two or more negative lenses included in the first sub lens unit (1a), respectively, $\nu pa$ and $\theta pa$ represent an average Abbe number and an average partial dispersion ratio of materials of the one or more positive lenses included in the first lens unit (F), respectively, f1ns represents a combined focal length of the two or more negative lenses included in the first sub lens unit (1a), and ft represents a focal length of the zoom lens system at a telephoto end.

Further features of the present invention will become apparent from the following description of exemplary embodiments with reference to the attached drawings.

BRIEF DESCRIPTION OF THE DRAWINGS

FIG. 1 is a cross sectional view of a lens system of Numerical Embodiment 1 at the wide angle end in infinity focus.

FIG. 2A is an aberration diagram of Numerical Embodiment 1 at the wide angle end in focus at an objective distance of 2.5 m.

FIG. 4B is an aberration diagram of Numerical Embodiment 2 at the intermediate zoom position in focus at an objective distance of 2.5 m.

FIG. 4C is an aberration diagram of Numerical Embodiment 2 at the telephoto end in focus at an objective distance of 2.5 m.

DESCRIPTION OF THE EMBODIMENTS

An object of the present invention is to provide a zoom lens system that may correct the secondary spectrum of the longitudinal chromatic aberration appropriately on the telephoto side, and may easily realize high zoom ratio, a small size and light weight, and an image pickup apparatus including the zoom lens system.

Hereinafter, an embodiment of the present invention is described in detail with reference to the attached drawings. A zoom lens system according to the present invention includes a first lens unit having a positive refractive power which does not move for zooming, a second lens unit having a negative refractive power for magnification action, and a rear lens group including two or more lens units, arranged in this order from an object side to an image side. Here, "the lens unit does not move for zooming" means that the lens unit is not driven for a purpose of zooming, but the lens unit may move for focusing if zooming and focusing are performed simultaneously.

Figure 2B:
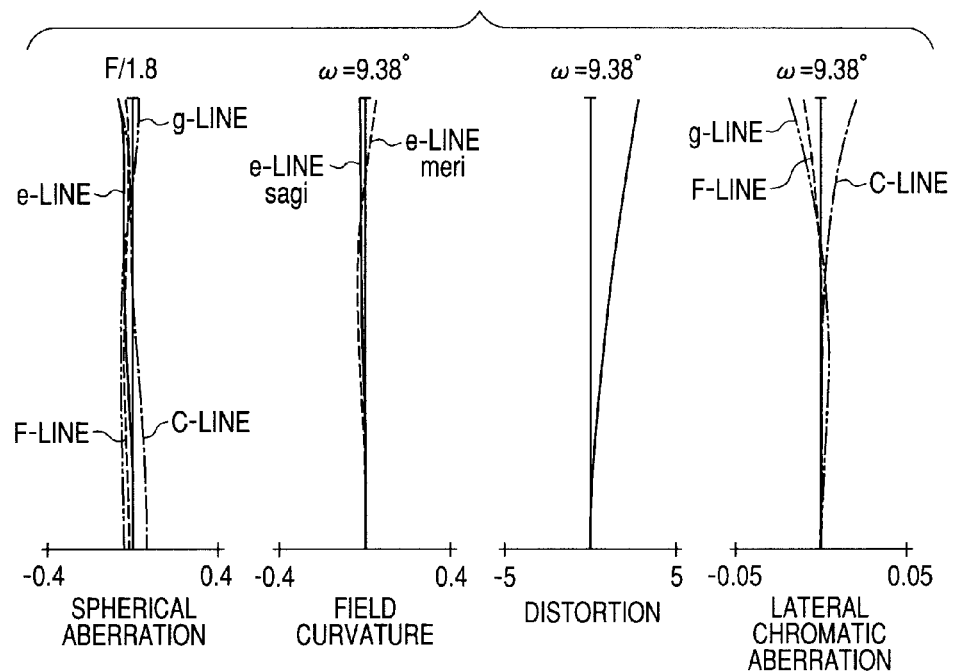
FIG. 2B is an aberration diagram of Numerical Embodiment 1 at the intermediate zoom position in focus at an objective distance of 2.5 m.
Figure 2C:
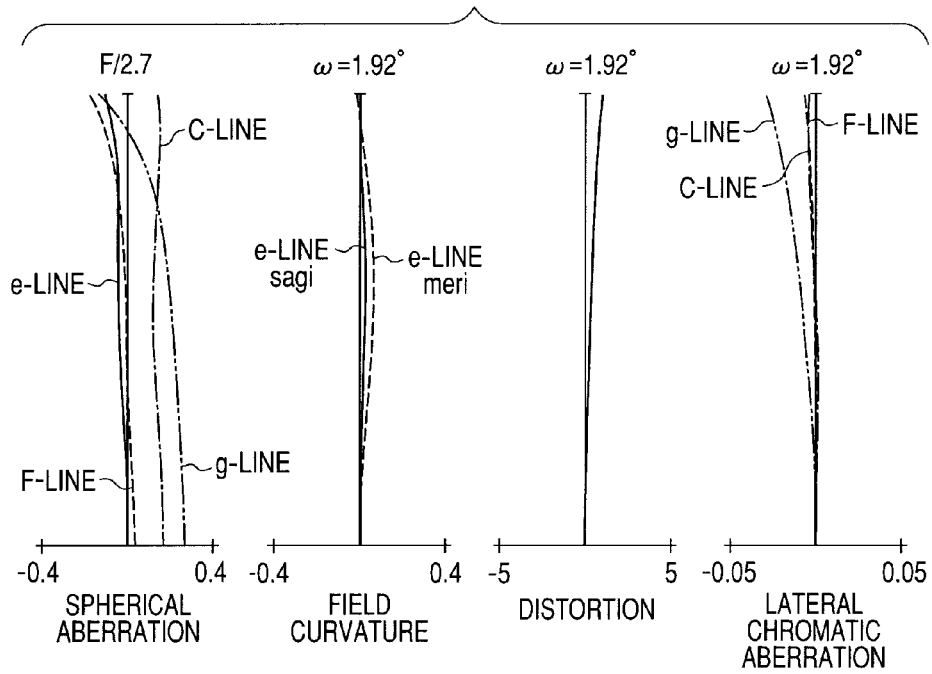
FIG. 2C is an aberration diagram of Numerical Embodiment 1 at the telephoto end in focus at an objective distance of 2.5 m.
Figure 3:
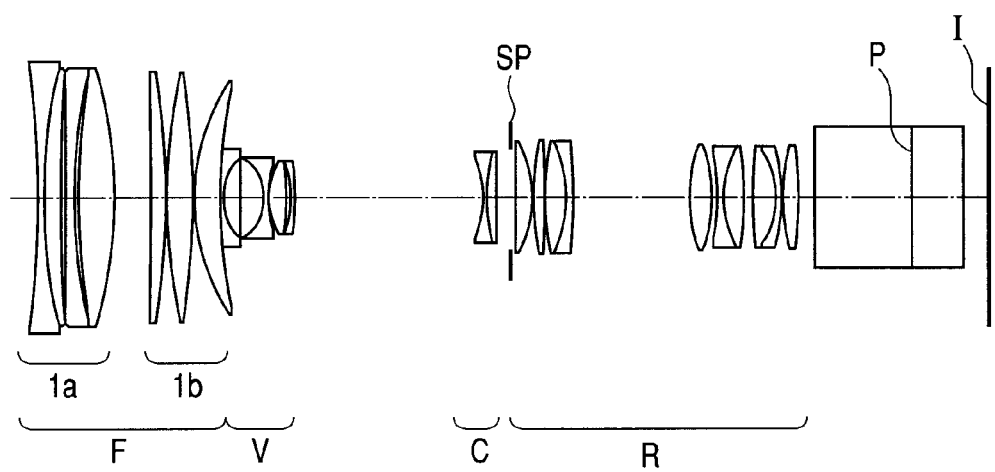
FIG. 3 is a cross sectional view of a lens system of Numerical Embodiment 2 at the wide angle end in infinity focus.
Figure 4A:
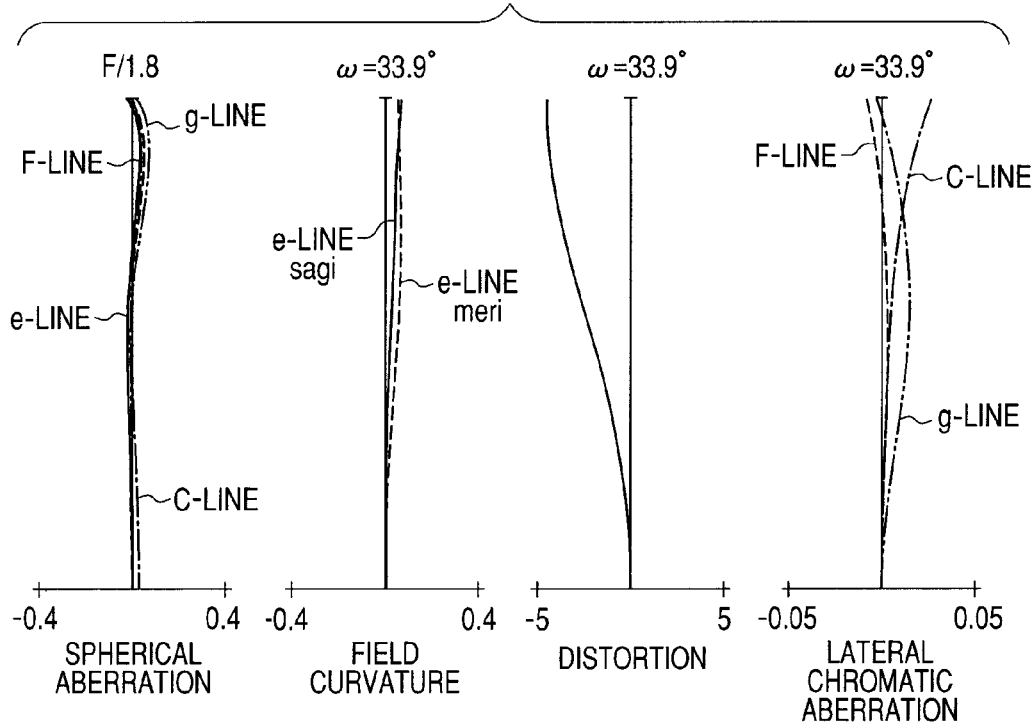
FIG. 4A is an aberration diagram of Numerical Embodiment 2 at the wide angle end in focus at an objective distance of 2.5 m.

FIG. 1 is a cross sectional view of a zoom lens system of Embodiment 1 (Numerical Embodiment 1) of the present invention at the wide angle end (short focal length end) in the focus state at the infinite objective distance. FIGS. 2A, 2B and 2C are aberration diagrams of Numerical Embodiment 1 in focus at an objective distance of 2.5 m at the wide angle end, at the intermediate zoom position (focal length f=33.3 mm), and at the telephoto end (long focal length end), respectively. Note that the focal length and the objective distance are values when the values of Numerical Embodiments are expressed in the unit of mm. The same is true for each of the following embodiments. FIG. 3 is a cross sectional view of a zoom lens system of Embodiment 2 (Numerical Embodiment 2) of the present invention at the wide angle end in the focus state at the infinite objective distance. FIGS. 4A, 4B and 4C are aberration diagrams of Numerical Embodiment 2 in focus at an objective distance of 2.5 m at the wide angle end, at the intermediate zoom position (focal length f=33.3 mm), and at the telephoto end, respectively.

Figure 5:
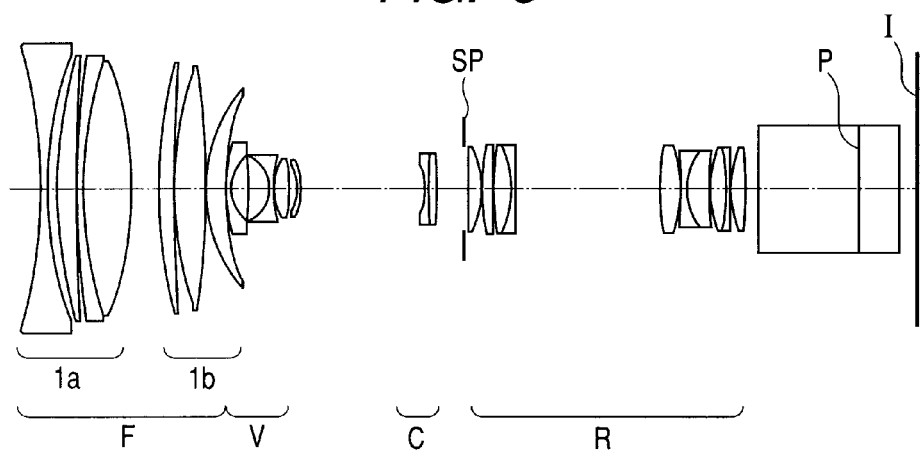
FIG. 5 is a cross sectional view of a lens system of Numerical Embodiment 3 at the wide angle end in infinity focus.
Figure 6A:
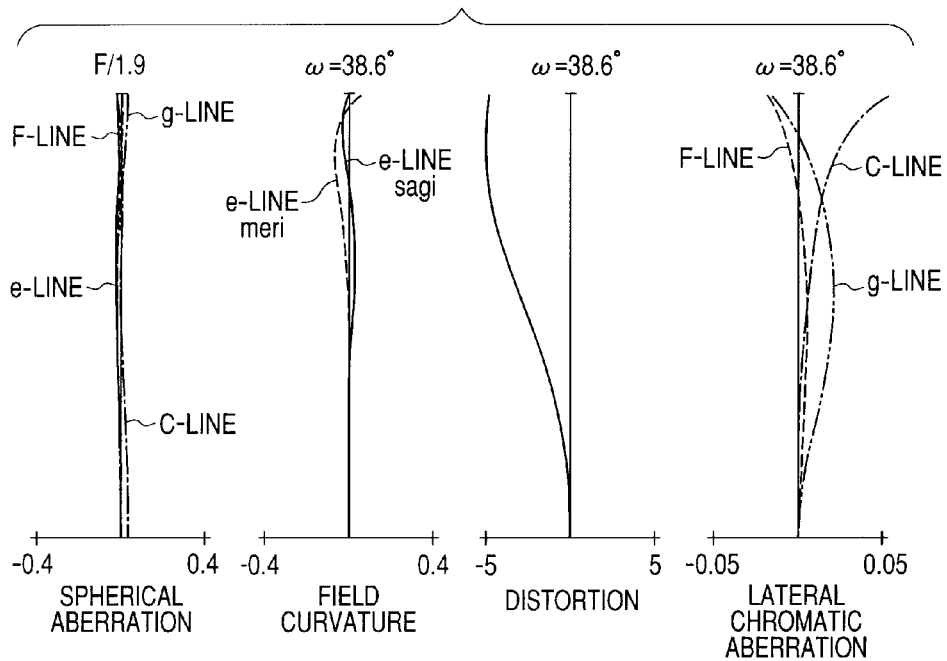
FIG. 6A is an aberration diagram of Numerical Embodiment 3 at the wide angle end in focus at an objective distance of 2.5 m.
Figure 6B:
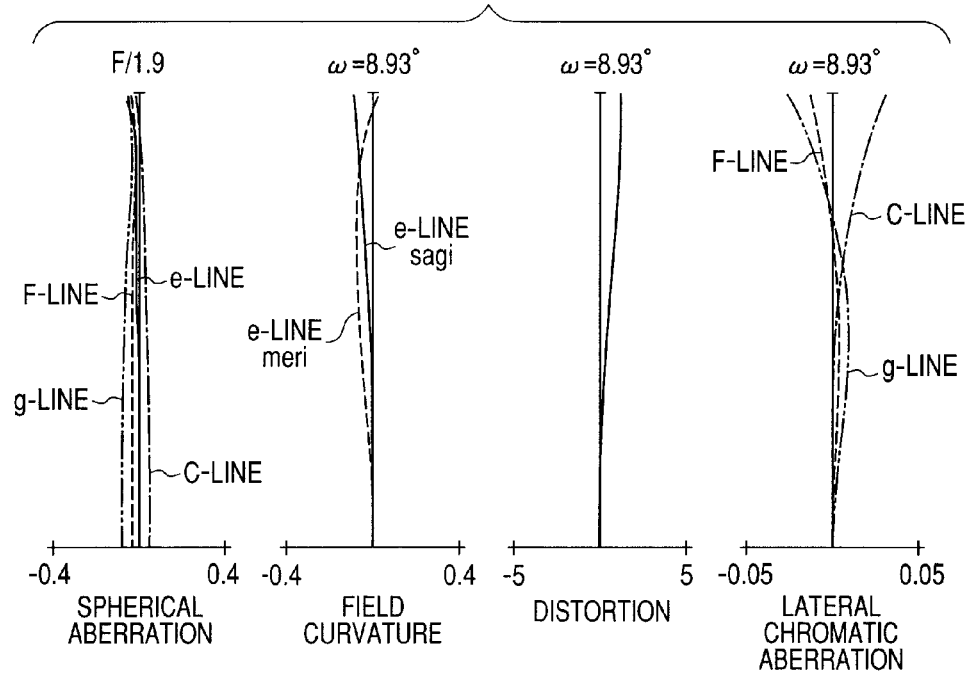
FIG. 6B is an aberration diagram of Numerical Embodiment 3 at the intermediate zoom position in focus at an objective distance of 2.5 m.
Figure 6C:
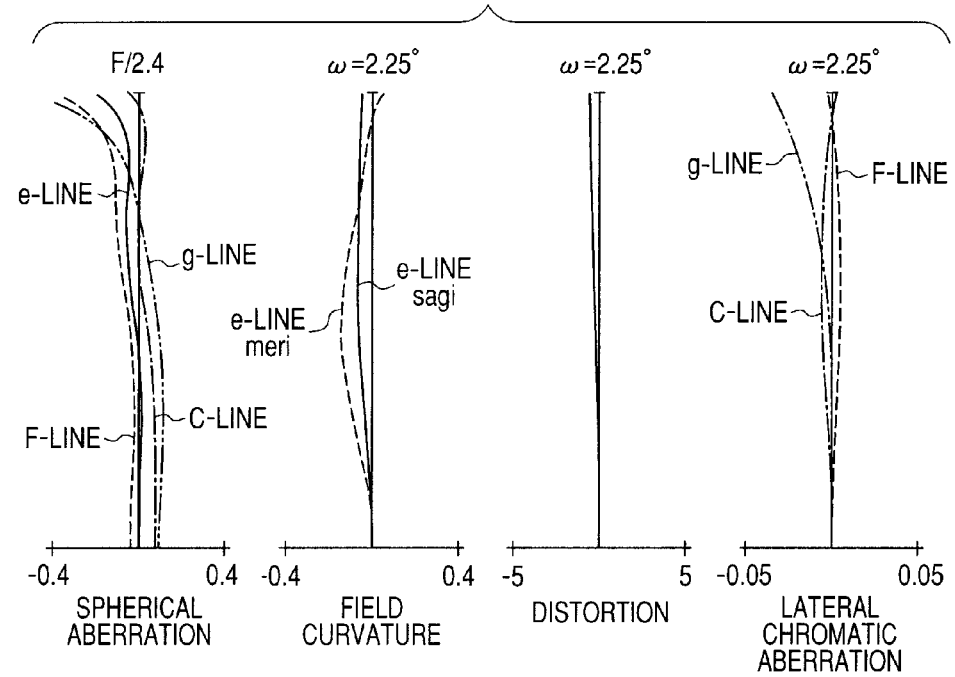
FIG. 6C is an aberration diagram of Numerical Embodiment 3 at the telephoto end in focus at an objective distance of 2.5 m.
Figure 7:
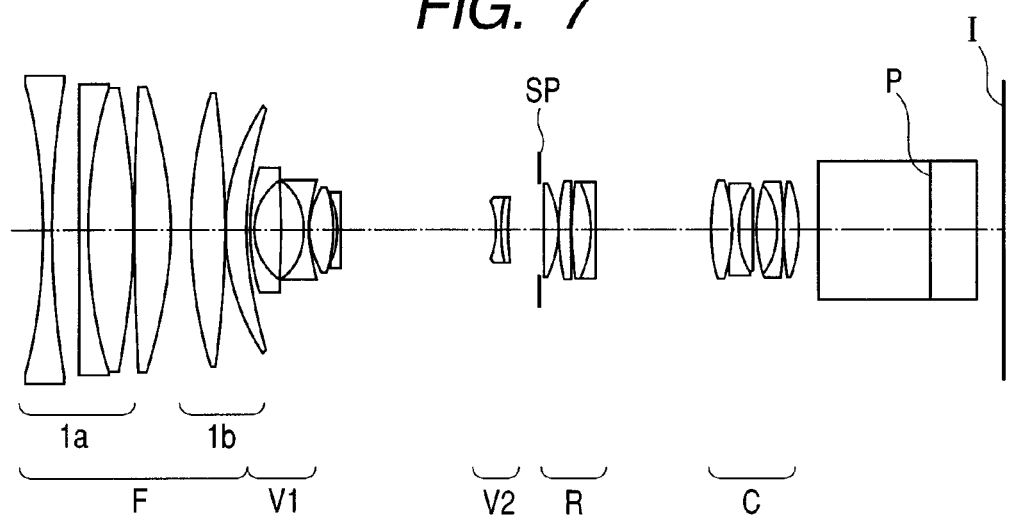
FIG. 7 is a cross sectional view of a lens system of Numerical Embodiment 4 at the wide angle end in infinity focus.
Figure 8A:
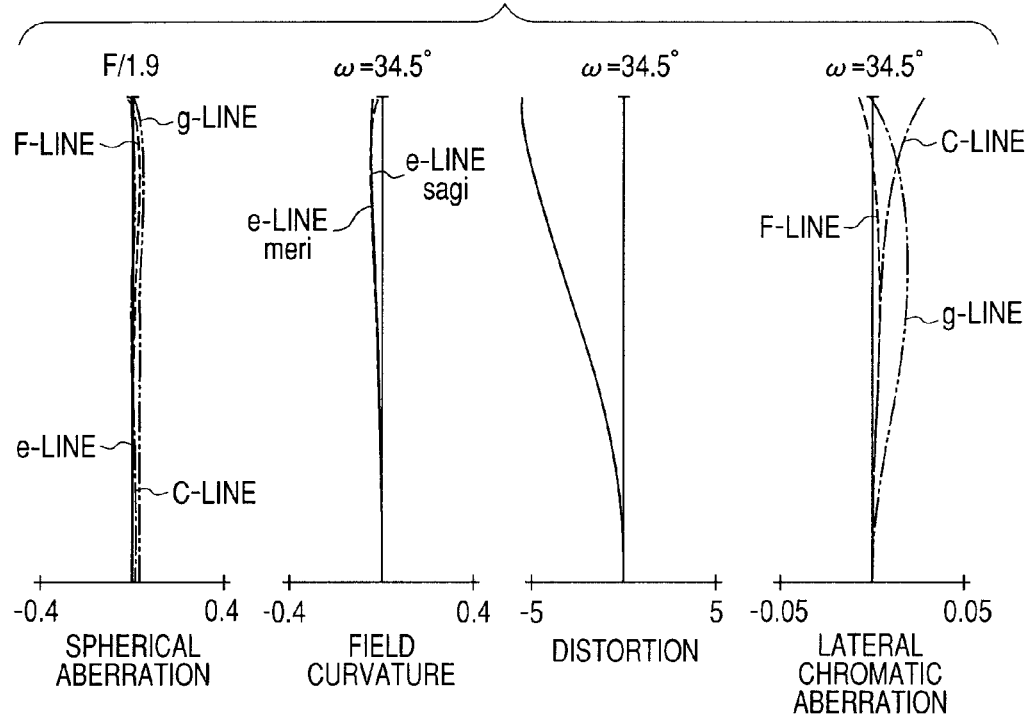
FIG. 8A is an aberration diagram of Numerical Embodiment 4 at the wide angle end in focus at an objective distance of 2.8 m.
Figure 8B:
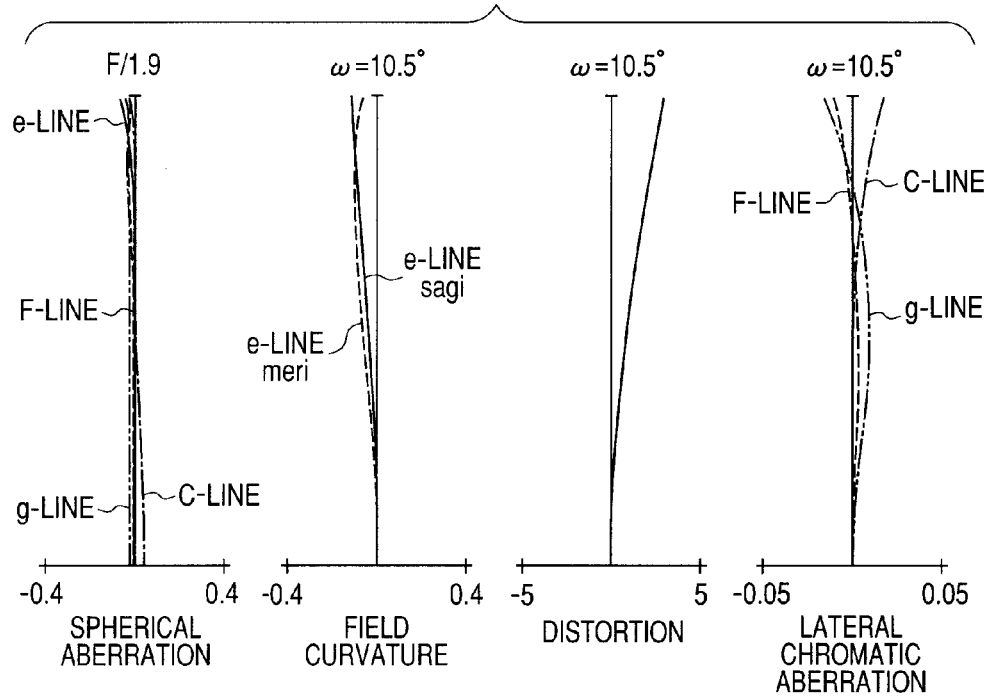
FIG. 8B is an aberration diagram of Numerical Embodiment 4 at the intermediate zoom position in focus at an objective distance of 2.8 m.
Figure 8C:
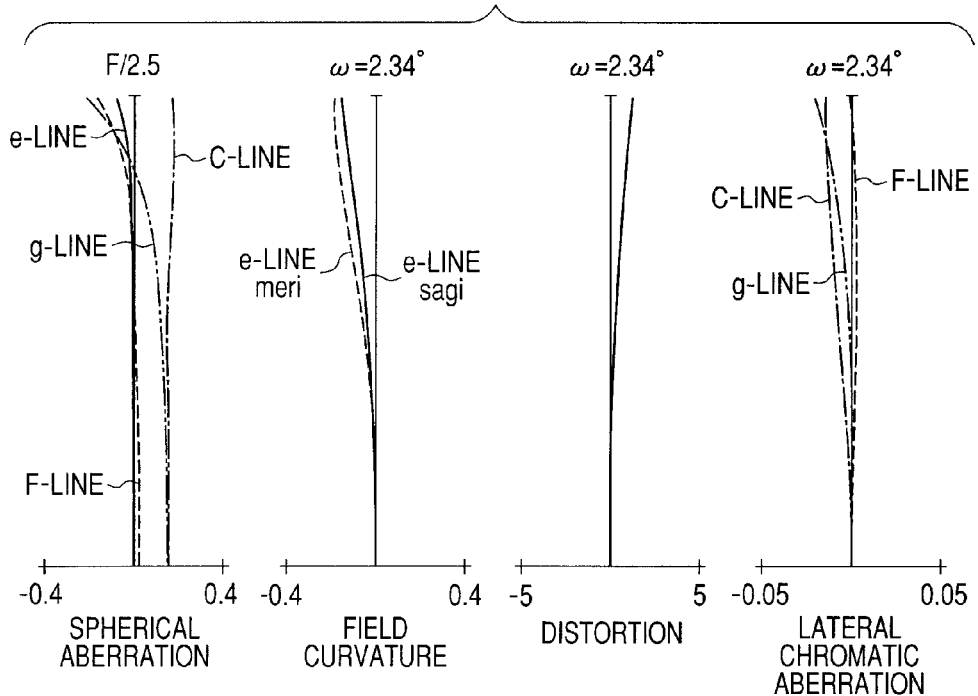
FIG. 8C is an aberration diagram of Numerical Embodiment 4 at the telephoto end in focus at an objective distance of 2.8 m.

FIG. 5 is a cross sectional view of a zoom lens system of Embodiment 3 (Numerical Embodiment 3) of the present invention at the wide angle end in the focus state at the infinite objective distance. FIGS. 6A, 6B and 6C are aberration diagrams of Numerical Embodiment 3 in focus at an objective distance of 2.5 m at the wide angle end, at the intermediate zoom position (focal length f=35 mm), and at the telephoto end, respectively. FIG. 7 is a cross sectional view of a zoom lens system of Embodiment 4 (Numerical Embodiment 4) of the present invention at the wide angle end in the focus state at the infinite objective distance. FIGS. 8A, 8B and 8C are aberration diagrams of Numerical Embodiment 4 in focus at an objective distance of 2.8 m at the wide angle end, at the intermediate zoom position (focal length f=29.5 mm), and at the telephoto end, respectively.

In the cross sectional views in FIGS. 1, 3 and 5, a front lens unit (first lens unit) F having a positive refractive power does not move for zooming. A sub-unit (first sub lens unit) 1a is fixed during focusing (does not move for focusing) and is disposed closest to the object side in the first lens unit F. A sub-unit (second sub lens unit) 1b having a positive refractive power moves during focusing and is disposed on the image side in the first lens unit F. A variator (second lens unit) V having a negative refractive power for magnification is moved monotonously on the optical axis toward the image plane side, so that magnification (zooming) is performed from the wide angle end to the telephoto end. A compensator (third lens unit) C having a negative refractive power moves on the optical axis non-linearly in association with a movement of the second lens unit so as to correct an image plane variation accompanying the magnification. The variator V and the compensator C constitute a magnification-varying system. A stop (aperture stop) SP is disposed on the image side of the third lens unit C. A relay lens unit (fourth lens unit) R having a positive refractive power is fixed so as to have an image formation action. A glass block P in the diagrams includes a color separation prism, an optical filter, and the like. An image pickup surface I corresponds to an image pickup surface of a solid state image pickup element (photoelectric transducer). Note that the compensator C and the relay lens unit R constitute a rear lens group.

In FIG. 7, a front lens unit (first lens unit) F having a positive refractive power does not move for zooming. A sub-unit (first sub lens unit) 1a does not move for focusing and is disposed closest to the object side in the first lens unit F. A sub-unit (second sub lens unit) 1b having a positive refractive power moves during focusing and is disposed on the image side in the first lens unit F. A first variator (second lens unit) V1 having a negative refractive power for magnification is moved on the optical axis toward the image plane side, so that magnification (zooming) is performed from the wide angle end to the telephoto end. A second variator (third lens unit) V2 having a negative refractive power works for magnification in the same manner as the first variator V1. A fixed lens unit (fourth lens unit) R having a positive refractive power is fixed. A compensator (fifth lens unit) C having a positive refractive power moves on the optical axis non-linearly so as to correct an image plane variation accompanying the magnification. The first variator V1, the second variator V2, and the compensator C constitute the magnification system. A stop (aperture stop) SP is disposed on the image side of the second variator V2. A glass block P in the diagram includes a color separation prism, an optical filter, and the like. An image pickup surface I corresponds to an image pickup surface of a solid state image pickup element. Note that the second variator V2, the fixed lens unit R, and the compensator C constitute a rear lens group.

In each embodiment, the first lens unit F includes the first sub lens unit 1a which does not move for focusing and the second sub lens unit 1b which moves for focusing. The first sub lens unit 1a includes two or more negative lenses and one or more positive lenses. An average Abbe number of materials of the negative lenses included in the first sub lens unit 1a and an average partial dispersion ratio are denoted by vna and θna, respectively. An average Abbe number of materials of the positive lenses included in the first lens unit F and an average partial dispersion ratio are denoted by vpa and θpa, respectively. A combined focal length of the negative lenses included in the first sub lens unit 1a is denoted by fns, and a focal length of the zoom lens system at the telephoto end is denoted by ft. Then, the following conditions are satisfied.

$$-1.193 \times 10^{-3} < (\theta pa - \theta na)/(vpa - vna) < -0.904 \times 10^{-3} \quad (1)$$

$$40 < vpa - vna < 55 \quad (2)$$

$$-0.465 < fns/ft \quad (3)$$

Here, the combined focal length fns is expressed by the following equation:

$$\frac{1}{f1ns} = \frac{1}{f1} + \frac{1}{f2} + \ldots \frac{1}{fn}$$

where n represents a number of negative lenses included and fi represents a focal length of the i-th negative lens.

In each embodiment, the conditions including the lens configuration of the first lens unit F and the dispersion characteristic of the lens material are defined by the conditional expressions (1) to (3), so that the secondary spectrum of the longitudinal chromatic aberration at the telephoto end is corrected appropriately. The conditional expression (1) shows the condition for reducing a remaining amount of the secondary spectrum of the longitudinal chromatic aberration in the first lens unit F so that the secondary spectrum of the longitudinal chromatic aberration at the telephoto end is appropriately corrected. The general outline of this condition is described with reference to FIGS. 9 and 10.

Figure 9:
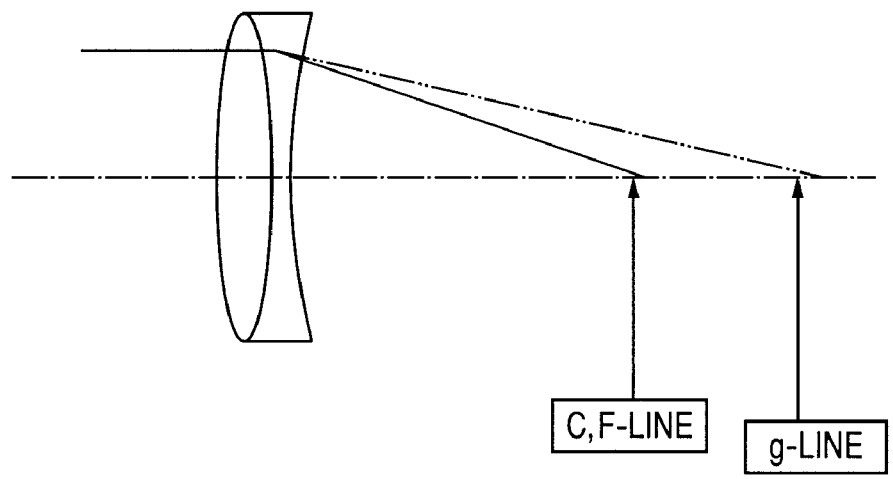
FIG. 9 is a schematic diagram illustrating an achromatic positive lens unit and remaining secondary spectrum.
Figure 10:
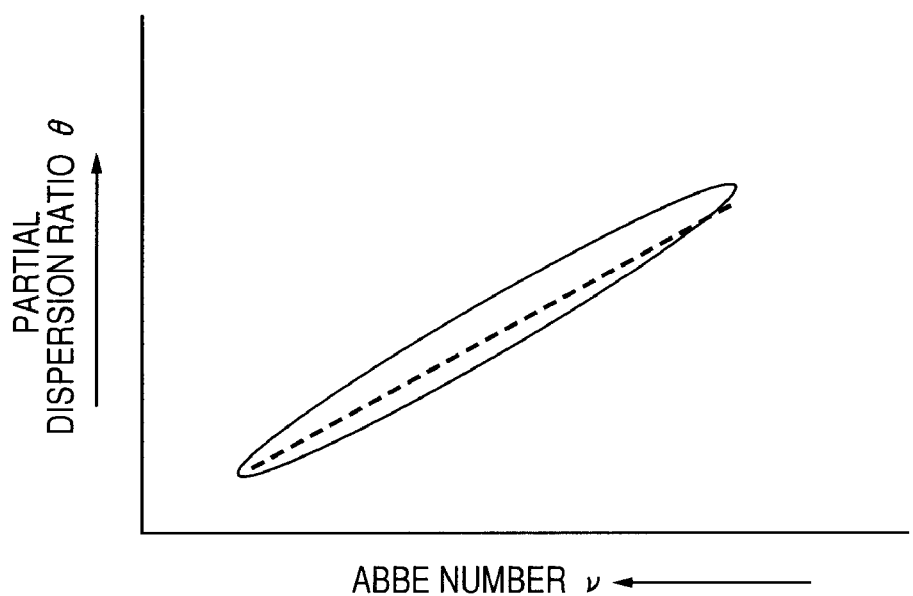
FIG. 10 is a schematic graph of a distribution of an Abbe number ν and a partial dispersion ratio θ of optical materials.

FIG. 9 is a schematic diagram illustrating an achromatic lens unit LP having a positive refractive power and remaining secondary spectrum. FIG. 10 is a schematic diagram of a distribution of an Abbe number v and a partial dispersion ratio θ of existing optical materials. Here, the Abbe number v and the partial dispersion ratio θ are respectively expressed by the following equations:

$$v = (Nd - 1)/(NF - NC) \quad (a)$$

$$\theta = (Ng - NF)/(NF - NC) \quad (b)$$

where Ng represents a refractive index with respect to the g-line, NF represents a refractive index with respect to the F-line, Nd represents a refractive index with respect to the d-line, and NC represents a refractive index with respect to the C-line.

As illustrated in FIG. 10, the existing optical material is distributed in the region having narrow partial dispersion ratio θ with respect to the Abbe number v, and there is a tendency that the partial dispersion ratio θ increases as the Abbe number v decreases. A correction condition of chromatic aberration of a thin lens system constituted of two lenses G1 and G2 having refracting powers φ1 and φ2 and Abbe numbers of materials v1 and v2, respectively is expressed by the following equation.

$$\phi1/v1 + \phi2/v2 = 0 \quad (c)$$

Here, combined refracting power φ is expressed as follows.

$$\phi = \phi1 + \phi2 \quad (d)$$

If the equation (c) is satisfied, an imaging position is identical between the C-line and the F-line as illustrated in FIG. 9.

In this case, the refracting powers φ1 and φ2 are expressed by the following equations.

$$\phi1 = \phi \times v1/(v1 - v2) \quad (e)$$

$$\phi2 = -\phi \times v2/(v1 - v2) \quad (f)$$

In FIG. 9, as to the achromatic lens unit LP having a positive refractive power, a material having a large Abbe number v1 is used for the positive lens G1, and a material having a small Abbe number v2 is used for the negative lens G2. Therefore, the positive lens G1 has a small partial dispersion ratio θ1, and the negative lens G2 has a large partial dispersion ratio θ2 as illustrated in FIG. 10. As illustrated in FIG. 9, if the chromatic aberration is corrected at the F-line and the C-line, the imaging point at the g-line is shifted to the image side. This deviation amount defined as a secondary spectrum amount Δ is expressed by the following equation.

$$\Delta = -(1/\phi) \times (\theta1 - \theta2)/(v1 - v2) \quad (g)$$

Here, the secondary spectrum amounts of the first sub lens unit 1a, the second sub lens unit 1b, and the lens unit in the image side of the magnification systems V and C are denoted by Δ1a, Δ1b, and ΔZ, respectively. Imaging magnification factors of the second sub lens unit 1b and the lens unit in the image side of the magnification systems V and C are denoted by β1b and βZ, respectively. Then, the secondary spectrum amount Δ of the entire lens system is expressed by the following equation.

$$\Delta = \Delta1a \times \alpha1b^2 \times \beta Z^2 + \Delta1b \times (1 - \beta1b) \times \beta Z^2 + \Delta Z \times (1 - \beta Z) \quad (h)$$

The secondary spectrum amount Δ becomes significant in the first sub lens unit 1a and the second sub lens unit 1b in which an axial marginal light beam passes through at a high position on the telephoto side. Therefore, the longitudinal chromatic aberration secondary spectrum amount Δ may be reduced on the telephoto side by suppressing the sum of the secondary spectrum amounts Δ1a and Δ1b of the longitudinal chromatic aberration generated in the first sub lens unit 1a and the second sub lens unit 1b.

When the upper limit of the conditional expression (1) is exceeded, dispersions of the positive lens and the negative lens naturally become close to each other in existing general optical materials. Then, each lens power in the first lens unit F increases so that a curvature of the lens surface increases. As a result, it becomes difficult to correct various aberrations, in particular, a higher order aberration. In addition, because the lens becomes thick, it becomes difficult to reduce size and weight of the first lens unit F. If the lower limit of the conditional expression (1) is exceeded, the sum of the secondary spectrum amounts (Δ1a+Δ1b) of the first sub lens unit 1a and the second sub lens unit 1b increases. Therefore, it becomes difficult to correct the longitudinal chromatic aberration appropriately on the telephoto end.

The conditional expression (2) defines a relative relationship between material dispersions of the positive lens and the negative lens for the first lens unit F to have an appropriate achromatic effect. If the upper limit of the conditional expression (2) is exceeded, it becomes difficult for the first lens unit F including the positive lens and the negative lens for the achromatic effect to have an appropriate refractive power. Then, it becomes difficult to push the rear principal point position of the first lens unit F toward the image side. As a result, it becomes difficult to realize wide angle and to reduce size and weight of the first lens unit F. If the lower limit of the conditional expression (2) is exceeded, each lens power in the first lens unit F increases so that a curvature of the lens surface increases. As a result, it becomes difficult to correct, in particular, higher order aberration. In addition, the lens becomes thick, so that it becomes difficult to reduce size and weight of the first lens unit F.

The conditional expression (3) defines the condition to satisfy both appropriate correction of the chromatic aberration and reduction of size and weight of the first lens unit F when a zoom lens system having a large magnification ratio (zoom ratio) is obtained. If the lower limit of the conditional expression (3) is exceeded, the negative refractive power included in the first sub lens unit 1a is decreased, so that it becomes difficult to obtain the appropriate achromatic effect at the telephoto end of the zoom lens. In addition, it becomes difficult to push the rear principal point position of the first lens unit F toward the image side, and it becomes difficult to realize a wide angle and to reduce size and weight of the first lens unit F. Further, it is preferred that numerical value ranges of the conditional expressions (1) to (3) be set as follows.

$$-1.191 \times 10^{-3} < (\theta pa - \theta na)/(\nu pa - \nu na) < -0.910 \times 10^{-3} \quad (1a)$$

$$41.0 < \nu pa - \nu na < 52.0 \quad (2a)$$

$$-0.465 < f1ns/ft < -0.400 \quad (3a)$$

The technical meanings of the conditional expressions (1a) and (2a) are the same as the technical meanings of the conditional expressions (1) and (2) described above. If the upper limit of the conditional expression (3a) is exceeded, the negative refractive power included in the first sub lens unit 1a increases, so that it becomes difficult to correct various aberrations, in particular, the higher order aberration. In addition, a curvature of the lens surface of the negative lens increases, so that it becomes difficult to reduce size and weight of the first lens unit F.

With the structure described above, it is possible to provide a zoom lens system having a high zoom ratio in which the secondary spectrum of the longitudinal chromatic aberration is appropriately corrected at the telephoto end, and in which reduction of size and weight is achieved. In each embodiment, it is more preferred that one or more of the following conditions be satisfied, $$15.0 < \nu na < 30.3 \quad (4)$$

$$0.350 < f1/ft < 0.425 \quad (5)$$

$$15 < ft/fw \quad (6)$$

where f1 represents a focal length of the first lens unit F, fw represents a focal length of the zoom lens system at the wide angle end.

The conditional expression (4) defines the average Abbe number vna of materials of negative lenses included in the first sub lens unit 1a that are appropriate for correcting the secondary spectrum of the longitudinal chromatic aberration of the zoom lens system at the telephoto side more appropriately.

If the upper limit of the conditional expression (4) is exceeded, the refracting powers of the two negative lenses in the first sub lens unit 1a increase, so that it becomes difficult to correct various aberrations, in particular, higher order aberration. In addition, a curvature of the lens surface of the lens increases, so that the lens becomes thick. As a result, it becomes difficult to reduce size and weight of the first sub lens unit 1a. If the lower limit of the conditional expression (4) is exceeded, the two negative lenses in the first lens unit F may not have appropriate refracting powers, so that it becomes difficult to push a principal point interval toward the image side. As a result, it becomes difficult to realize a wide angle and to reduce size and weight of the first lens unit F.

The conditional expression (5) defines an optimal range of the focal length of the first lens unit F with respect to the focal length at the telephoto end for realizing high magnification-varying factor (high zoom ratio) while the longitudinal chromatic aberration is corrected appropriately. If the lower limit of the conditional expression (5) is exceeded, the refractive power of the first lens unit F increases, so that it becomes difficult to correct mainly spherical aberration at the telephoto end and higher order components of the off-axial aberration appropriately. If the upper limit of the conditional expression (5) is exceeded, the refracting power of the first lens unit F is decreased, so that it becomes difficult to realize both the high zooming factor (high zoom ratio) and downsizing of the first lens unit F.

The conditional expression (6) is for correcting the chromatic aberration appropriately at the telephoto end while obtaining an optimal zoom ratio. If the zoom ratio exceeds the lower limit of the conditional expression (6), it is easy to realize reduction of size and weight without deteriorating the longitudinal chromatic aberration at the telephoto end and various aberrations even by the conventional lens structure. It is more preferred that the numerical value ranges in the conditional expressions (4) to (6) be set as follows.

$$20.0 < \nu na < 30.0 \quad (4a)$$

$$0.360 < f1/ft < 0.423 \quad (5a)$$

$$16 < ft/fw < 25 \quad (6a)$$

When the zoom lens system of the present invention is used for an image pickup apparatus including a photoelectric transducer such as a CCD, it is preferred that the condition expressed by the following expression be satisfied, $$0.6 < fw/IS \quad (7)$$

where IS represents a diagonal length of an effective surface of the photoelectric transducer.

The conditional expression (7) defines an optimal relative relationship between the focal length at the wide angle end of a zoom lens system and the diagonal length of the image pickup element when the zoom lens system of the present invention is used for the image pickup apparatus. If the lower limit of the conditional expression (7) is exceeded, the zoom lens system becomes to have an excessively wide field angle, so that it becomes difficult to correct a distortion or off-axial aberration such as lateral chromatic aberration. It is more preferred that the numerical value of the conditional expression (7) be set as follows.

$$0.62 < fw/IS < 0.80 \quad (7a)$$

Next, the configuration of the first lens unit F in each embodiment is described. First, the configuration of the first lens unit F in Embodiment 1 illustrated in FIG. 1 is described. The first lens unit F corresponds to the first to the twelfth lens surfaces, and is constituted by the first sub lens unit 1a including the first to the sixth lens surfaces and the second sub lens unit 1b including the seventh to the twelfth surfaces. The first sub lens unit 1a is constituted by a negative lens, a negative lens, and a positive lens arranged in this order from the object side. The second sub lens unit 1b is constituted by three positive lenses. Table 1 shows values corresponding to the individual conditional expressions in Embodiment 1. Numerical Embodiment 1 satisfies every conditional expression, so that the longitudinal chromatic aberration is appropriately corrected at the telephoto end while the high zoom ratio (high magnification factor) and reduction in size and weight of the entire system are achieved.

Next, the configuration of the first lens unit F in Embodiment 2 illustrated in FIG. 3 is described. The first lens unit F corresponds to the first to the fourteenth lens surfaces, and is constituted by the first sub lens unit 1a including the first to the eighth lens surfaces and the second sub lens unit 1b including the ninth to the fourteenth surfaces. The first sub lens unit 1a is constituted by a negative lens, a positive lens, a negative lens, and a positive lens arranged in this order from the object side. The second sub lens unit 1b is constituted by three positive lenses. Table 1 shows values corresponding to the individual conditional expressions in Embodiment 2. Numerical Embodiment 2 satisfies every conditional expression, so that the longitudinal chromatic aberration is appropriately corrected at the telephoto end while the high zoom ratio and reduction in size and weight of the entire system are achieved.

Next, the configuration of the first lens unit F in Embodiment 3 illustrated in FIG. 5 is described. The first lens unit F corresponds to the first to the fourteenth lens surfaces, and is constituted by the first sub lens unit 1a including the first to the eighth lens surfaces and the second sub lens unit 1b including the ninth to the fourteenth surfaces. The first sub lens unit 1a is constituted by a negative lens, a positive lens, a negative lens, and a positive lens arranged in this order from the object side. The second sub lens unit 1b is constituted by three positive lenses. Table 1 shows values corresponding to the individual conditional expressions in Embodiment 3. Numerical Embodiment 3 satisfies every conditional expression, so that the longitudinal chromatic aberration is appropriately corrected at the telephoto end while the high zoom ratio and reduction in size and weight of the entire system are achieved.

Next, the first lens unit F in Embodiment 4 illustrated in FIG. 7 is described. The first lens unit F corresponding to the first to the eleventh lens surfaces and is constituted by the first sub lens unit 1a including the first to the seventh lens surfaces and the second sub lens unit 1b including the eighth to the eleventh surfaces. The first sub lens unit 1a is constituted by a negative lens, a cemented lens constituted by a negative lens and a positive lens, and a positive lens arranged in this order from the object side. The second sub lens unit 1b is constituted by two positive lenses. Table 1 shows values corresponding to the individual conditional expressions in Embodiment 4. Numerical Embodiment 4 satisfies every conditional expression, so that the longitudinal chromatic aberration is appropriately corrected at the telephoto end while the high zoom ratio and the reduction in size and weight are achieved. As described above, the preferred embodiments of the present invention are described. However, it goes without saying that the present invention is not limited to these embodiments, which may be modified and changed variously within the spirit thereof.

Figure 11:
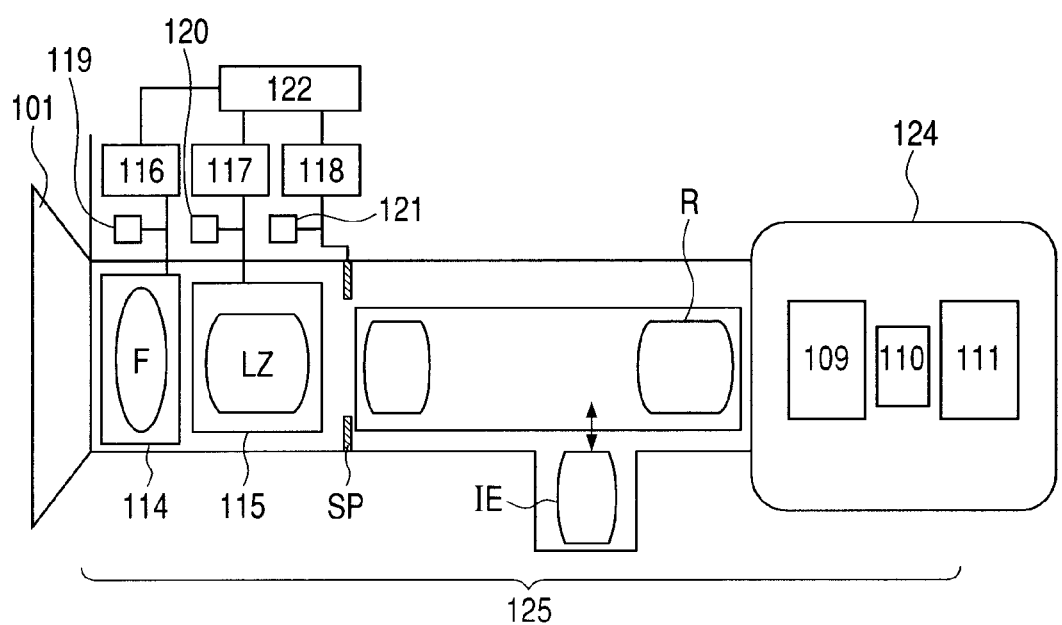
FIG. 11 is a schematic diagram of a main part of an image pickup apparatus according to the present invention.

FIG. 11 is a principal schematic diagram illustrating an image pickup apparatus (television (TV) camera system) using the zoom lens system according to each of the Embodiments 1 to 3 as an image pickup optical system. In FIG. 11, a zoom lens system 101 according to any one of Embodiments 1 to 3 and a camera 124 are provided. The zoom lens system 101 is detachably attached to the camera 124. An image pickup apparatus 125 has a structure in which the zoom lens system 101 is attached to the camera 124. The zoom lens system 101 includes a first lens unit F, a magnification-varying section LZ, and a fourth lens unit R for imaging. The first lens unit F includes a focusing lens unit. The magnification section LZ includes a second lens unit which moves on the optical axis so as to vary the magnification and a third lens unit which moves on the optical axis so as to correct an image plane variation accompanying the magnification.

The zoom lens system 101 includes the aperture stop SP. The fourth lens unit R includes a lens unit (magnification optical system) IE which may be inserted onto or removed from the optical path. The lens unit IE is provided to shift the focal length range of the entire system of the zoom lens system 101. Drive mechanisms 114 and 115 such as helicoids or cams drive the first lens unit F and the magnification section LZ, respectively, in the optical axis direction. Motors (drive units) 116 to 118 are provided to electrically drive the drive mechanisms 114 and 115 and the aperture stop SP. Detectors 119 to 121 such as encoders, potentiometers, or photosensors detect positions of the first lens unit F and the magnification section LZ on the optical axis and a stop diameter of the aperture stop SP.

The camera 124 includes a glass block 109 corresponding to an optical filter or a color separation prism, and a solid-state image pickup element (photoelectric transducer) 110 such as a CCD sensor or a CMOS sensor, for receiving a subject image formed by the zoom lens system 101. CPUs 111 and 122 perform various drive controls of the camera 124 and the main body of the zoom lens system 101, respectively. When the zoom lens system according to the present invention is applied to the TV camera system as described above, the image pickup apparatus having high optical performance is realized. Note that the zoom lens system according to the Embodiment 4 of the present invention may also be applied to a TV camera as in the case of Embodiments 1 to 3.

Hereinafter, Numerical Embodiments 1 to 4 corresponding to Embodiments 1 to 4 of the present invention are described. In the respective numerical embodiments, a surface number "i" is counted from the object side. In addition, ri indicates a curvature radius of an i-th surface counted from the object side, and di indicates an interval between the i-th surface and an (i+1)-th surface which are counted from the image side. Further, ndi and vdi indicate a refractive power and an Abbe number of an i-th optical material, respectively. Last three surfaces correspond to a glass block such as a filter. Assume that the optical axis direction is an X-axis, a direction perpendicular to the optical axis is an H axis, and a light traveling direction is positive. In this case, when R denotes a paraxial curvature radius, k denotes a conic constant, and A3, A4, A5, A6, A7, A8, A9, A10, A11, and A12 denote aspherical coefficients, an aspherical surface shape is expressed by the following expression. For example, "e-Z" indicates "$\times 10^{-Z}$". The mark "*" indicates the aspherical surface. Table 1 shows a correspondence relationship between the respective embodiments and the conditional expressions described above.

$$X = \frac{H^2/R}{1 + \sqrt{1 - (1+k)(H/R)^2}} + \quad \text{Equation 2}$$
$$A4H^4 + A6H^6 + A8H^8 + A10H^{10} + A12H^{12} +$$
$$A3H^3 + A5H^5 + A7H^7 + A9H^9 + A11H^{11}$$

Numerical Embodiment 1

Surface data

| Surface number | r | d | nd | vd | Effective diameter |
|---|---|---|---|---|---|
| 1 | −332.526 | 1.80 | 1.90200 | 25.1 | 76.53 |
| 2 | 524.636 | 5.84 | | | 75.14 |
| 3 | −272.645 | 1.80 | 1.72047 | 34.7 | 74.42 |
| 4 | 119.340 | 0.12 | | | 73.71 |
| 5 | 119.387 | 13.93 | 1.43875 | 95.0 | 73.78 |
| 6 | −118.750 | 8.04 | | | 74.03 |
| 7 | 1839.222 | 5.81 | 1.43875 | 95.0 | 73.20 |
| 8 | −156.962 | 0.15 | | | 73.09 |
| 9 | 129.687 | 8.48 | 1.59240 | 68.3 | 71.91 |
| 10 | −369.251 | 0.15 | | | 71.70 |
| 11 | 62.991 | 8.08 | 1.77250 | 49.6 | 67.86 |
| 12 | 163.572 | (Variable) | | | 66.72 |
| 13* | 228.519 | 0.70 | 1.88300 | 40.8 | 26.83 |
| 14 | 16.139 | 5.93 | | | 22.17 |
| 15 | −162.360 | 6.59 | 1.80518 | 25.4 | 21.70 |
| 16 | −15.005 | 0.70 | 1.75500 | 52.3 | 21.31 |
| 17 | 27.315 | 0.68 | | | 19.68 |
| 18 | 22.172 | 5.61 | 1.60342 | 38.0 | 19.88 |
| 19 | −39.636 | 0.88 | | | 19.33 |
| 20 | −24.853 | 0.70 | 1.83481 | 42.7 | 19.21 |
| 21 | −134.693 | (Variable) | | | 19.68 |
| 22 | −28.312 | 0.70 | 1.74320 | 49.3 | 22.52 |
| 23 | 46.740 | 2.80 | 1.84666 | 23.8 | 24.99 |
| 24 | −2634.956 | (Variable) | | | 25.48 |
| 25 (Stop) | ∞ | 1.30 | | | 29.38 |
| 26 | 363.155 | 4.88 | 1.65844 | 50.9 | 30.81 |
| 27 | −34.292 | 0.15 | | | 31.18 |
| 28 | 78.344 | 3.20 | 1.51823 | 58.9 | 31.81 |
| 29 | −1293.355 | 0.15 | | | 31.71 |
| 30 | 79.771 | 7.00 | 1.51633 | 64.1 | 31.49 |
| 31 | −31.873 | 1.80 | 1.83400 | 37.2 | 31.21 |
| 32 | −345.747 | 35.20 | | | 31.35 |
| 33 | 52.089 | 5.88 | 1.48749 | 70.2 | 30.29 |
| 34 | −49.909 | 1.67 | | | 30.00 |
| 35 | −88.953 | 1.80 | 1.83481 | 42.7 | 28.00 |
| 36 | 28.616 | 6.25 | 1.51742 | 52.4 | 27.30 |
| 37 | −108.754 | 3.17 | | | 27.53 |
| 38 | 89.432 | 6.93 | 1.48749 | 70.2 | 27.77 |
| 39 | −29.788 | 1.80 | 1.83400 | 37.2 | 27.59 |
| 40 | −123.485 | 0.18 | | | 28.20 |
| 41 | 53.971 | 4.90 | 1.51633 | 64.1 | 28.39 |
| 42 | −82.923 | 4.50 | | | 28.13 |
| 43 | ∞ | 30.00 | 1.60342 | 38.0 | 40.00 |
| 44 | ∞ | 16.20 | 1.51633 | 64.2 | 40.00 |
| 45 | ∞ | (Variable) | | | 40.00 |
| Image plane | ∞ | | | | |

Aspherical Surface data
Thirteenth surface

K = 8.58860e+000   A4 = 7.05382e−006   A6 = −1.80303e−008
A8 = 7.49637e−011   A10 = −8.01854e−013   A12 = 5.80206e−015
A3 = −4.50041e−007   A5 = 1.66019e−008   A7 = −8.87373e−010
A9 = 1.99340e−011   A11 = −1.17115e−013

Various data
Zoom ratio 20.00

| Focal length | 8.20 | 16.40 | 33.29 | 109.33 | 164.00 |
|---|---|---|---|---|---|
| F number | 1.80 | 1.80 | 1.80 | 1.87 | 2.73 |
| Field angle | 33.85 | 18.54 | 9.38 | 2.88 | 1.92 |
| Image height | 5.50 | 5.50 | 5.50 | 5.50 | 5.50 |
| Total lens length | 267.97 | 267.97 | 267.97 | 267.97 | 267.97 |
| BF | 41.33 | 41.33 | 41.33 | 41.33 | 41.33 |
| d12 | 1.17 | 22.84 | 37.62 | 51.83 | 54.42 |
| d21 | 55.34 | 30.57 | 13.32 | 2.39 | 4.78 |
| d24 | 4.40 | 7.50 | 9.97 | 6.69 | 1.71 |
| d45 | 7.50 | 7.50 | 7.50 | 7.50 | 7.50 |
| Entrance pupil position | 48.84 | 93.36 | 167.10 | 410.71 | 541.88 |
| Exit pupil position | 348.87 | 348.87 | 348.87 | 348.87 | 348.87 |
| Front principal point position | 57.24 | 110.54 | 203.64 | 555.06 | 784.67 |
| Rear principal point position | −0.70 | −8.90 | −25.80 | −101.84 | −156.50 |

Zoom lens unit data

| Unit | First surface | Focal length | Lens structure length | Front principal point position | Rear principal point position |
|---|---|---|---|---|---|
| 1 | 1 | 67.24 | 54.20 | 37.71 | 5.78 |
| 2 | 13 | −13.70 | 21.79 | 2.66 | −11.33 |
| 3 | 22 | −42.20 | 3.50 | −0.07 | −1.98 |
| 4 | 25 | 64.97 | 136.94 | 74.63 | −153.22 |

Numerical Embodiment 2

Surface data

| Surface number | r | d | nd | vd | Effective diameter |
|---|---|---|---|---|---|
| 1 | −321.282 | 1.80 | 1.80000 | 29.8 | 77.09 |
| 2 | 155.978 | 0.27 | | | 74.59 |
| 3 | 148.778 | 5.00 | 1.43387 | 95.1 | 74.52 |
| 4 | 939.166 | 1.64 | | | 74.28 |
| 5 | 7215.908 | 1.80 | 1.80000 | 29.8 | 73.96 |
| 6 | 142.263 | 1.56 | | | 72.80 |
| 7 | 181.560 | 11.04 | 1.43387 | 95.1 | 72.86 |
| 8 | −127.642 | 10.88 | | | 72.96 |
| 9 | −2147.703 | 4.17 | 1.43387 | 95.1 | 71.20 |
| 10 | −253.410 | 0.15 | | | 71.03 |
| 11 | 146.659 | 8.29 | 1.59240 | 68.3 | 71.37 |
| 12 | −222.853 | 0.15 | | | 71.31 |
| 13 | 59.292 | 7.70 | 1.77250 | 49.6 | 67.36 |
| 14 | 152.159 | (Variable) | | | 66.69 |
| 15* | 228.519 | 0.70 | 1.88300 | 40.8 | 27.77 |
| 16 | 16.263 | 5.43 | | | 22.82 |
| 17 | −10264.248 | 6.59 | 1.80518 | 25.4 | 22.54 |
| 18 | −15.549 | 0.70 | 1.75500 | 52.3 | 22.13 |
| 19 | 25.590 | 0.68 | | | 20.01 |
| 20 | 20.925 | 5.61 | 1.60342 | 38.0 | 20.17 |
| 21 | −53.448 | 1.38 | | | 19.48 |
| 22 | −24.853 | 0.70 | 1.83481 | 42.7 | 19.20 |
| 23 | −134.693 | (Variable) | | | 19.56 |
| 24 | −28.312 | 0.70 | 1.74320 | 49.3 | 22.53 |
| 25 | 46.740 | 2.80 | 1.84666 | 23.8 | 25.00 |
| 26 | −2634.956 | (Variable) | | | 25.48 |
| 27 (Stop) | ∞ | 1.30 | | | 29.39 |
| 28 | 394.928 | 5.18 | 1.65844 | 50.9 | 30.80 |
| 29 | −33.348 | 0.15 | | | 31.26 |
| 30 | 74.155 | 3.20 | 1.51823 | 58.9 | 31.80 |
| 31 | 3654.252 | 0.15 | | | 31.67 |
| 32 | 83.980 | 7.00 | 1.51633 | 64.1 | 31.46 |
| 33 | −31.528 | 1.50 | 1.83400 | 37.2 | 31.16 |
| 34 | −336.280 | 35.20 | | | 31.30 |
| 35 | 38.818 | 6.68 | 1.48749 | 70.2 | 30.21 |
| 36 | −49.746 | 1.67 | | | 29.82 |
| 37 | −75.132 | 1.80 | 1.83481 | 42.7 | 27.57 |
| 38 | 27.229 | 6.15 | 1.51742 | 52.4 | 26.68 |
| 39 | −399.526 | 2.67 | | | 26.88 |
| 40 | 180.001 | 6.83 | 1.48749 | 70.2 | 27.19 |
| 41 | −24.173 | 1.80 | 1.83400 | 37.2 | 27.22 |
| 42 | −51.301 | 0.18 | | | 28.26 |
| 43 | 58.679 | 4.80 | 1.51633 | 64.1 | 28.27 |
| 44 | −104.601 | 4.50 | | | 27.91 |
| 45 | ∞ | 30.00 | 1.60342 | 38.0 | 40.00 |
| 46 | ∞ | 16.20 | 1.51633 | 64.2 | 40.00 |

-continued

Numerical Embodiment 2

| 47 | ∞ | (Variable) | | 40.00 |
| Image plane | ∞ | | | |

Aspherical Surface data
Fifteenth surface

| | | |
|---|---|---|
| K = 8.58860e+000 | A4 = 7.05382e−006 | A6 = −1.80303e−008 |
| A8 = 7.49637e−011 | A10 = −8.01854e−013 | A12 = 5.80206e−015 |
| A3 = −4.50041e−007 | A5 = 1.66019e−008 | A7 = −8.87373e−010 |
| A9 = 1.99340e−011 | A11 = −1.17115e−013 | |

Various data
Zoom ratio 20.00

| | | | | | |
|---|---|---|---|---|---|
| Focal length | 8.20 | 16.40 | 33.29 | 109.33 | 164.00 |
| F number | 1.80 | 1.80 | 1.80 | 1.87 | 2.73 |
| Field angle | 33.85 | 18.54 | 9.38 | 2.88 | 1.92 |
| Image height | 5.50 | 5.50 | 5.50 | 5.50 | 5.50 |
| Total lens length | 268.50 | 268.50 | 268.50 | 268.50 | 268.50 |
| BF | 41.33 | 41.33 | 41.33 | 41.33 | 41.33 |
| d14 | 0.53 | 22.20 | 36.98 | 51.19 | 53.78 |
| d23 | 56.24 | 31.47 | 14.23 | 3.29 | 5.68 |
| d26 | 4.40 | 7.50 | 9.97 | 6.69 | 1.71 |
| d47 | 7.50 | 7.50 | 7.50 | 7.50 | 7.50 |
| Entrance pupil position | 49.27 | 93.79 | 167.53 | 411.14 | 542.31 |
| Exit pupil position | 332.44 | 332.44 | 332.44 | 332.44 | 332.44 |
| Front principal point position | 57.68 | 111.02 | 204.24 | 557.26 | 789.08 |
| Rear principal point position | −0.70 | −8.90 | −25.80 | −101.84 | −156.50 |

Zoom lens unit data

| Unit | First surface | Focal length | Lens structure length | Front principal point position | Rear principal point position |
|---|---|---|---|---|---|
| 1 | 1 | 67.24 | 54.47 | 38.14 | 5.59 |
| 2 | 15 | −13.70 | 21.79 | 3.10 | −10.42 |
| 3 | 24 | −42.20 | 3.50 | −0.07 | −1.98 |
| 4 | 27 | 65.91 | 136.94 | 76.20 | −155.53 |

Numerical Embodiment 3
Surface data

| Surface number | r | d | nd | vd | Effective diameter |
|---|---|---|---|---|---|
| 1 | −156.710 | 2.00 | 1.72047 | 34.7 | 88.52 |
| 2 | 126.311 | 3.19 | | | 82.79 |
| 3 | 148.734 | 5.82 | 1.43875 | 95.0 | 82.48 |
| 4 | 567.137 | 0.40 | | | 82.08 |
| 5 | 276.593 | 2.00 | 2.10446 | 17.1 | 81.43 |
| 6 | 116.332 | 0.00 | | | 79.53 |
| 7 | 116.332 | 16.37 | 1.49700 | 81.5 | 79.53 |
| 8 | −110.799 | 8.99 | | | 79.71 |
| 9 | 155.999 | 5.15 | 1.59240 | 68.3 | 78.64 |
| 10 | 626.005 | 0.15 | | | 78.33 |
| 11 | 121.931 | 10.16 | 1.70000 | 48.1 | 76.82 |
| 12 | −263.541 | 0.15 | | | 76.32 |
| 13 | 49.218 | 6.20 | 1.83481 | 42.7 | 63.39 |
| 14 | 85.248 | (Variable) | | | 62.65 |
| 15* | 143.379 | 1.00 | 1.88300 | 40.8 | 28.33 |
| 16 | 14.990 | 5.56 | | | 21.61 |
| 17 | −67.291 | 7.22 | 1.80809 | 22.8 | 21.49 |
| 18 | −12.199 | 0.75 | 1.88300 | 40.8 | 20.38 |
| 19 | 28.461 | 0.60 | | | 18.47 |
| 20 | 23.739 | 5.13 | 1.63980 | 34.5 | 18.61 |
| 21 | −36.481 | 2.69 | | | 18.09 |
| 22 | −16.019 | 0.75 | 1.81600 | 46.6 | 16.93 |
| 23 | −24.425 | (Variable) | | | 17.23 |
| 24 | −20.647 | 0.75 | 1.75500 | 52.3 | 16.28 |
| 25 | 154.228 | 2.93 | 1.84649 | 23.9 | 20.90 |
| 26 | −78.885 | (Variable) | | | 21.60 |
| 27 (Stop) | ∞ | 1.34 | | | 25.28 |
| 28 | 538.417 | 4.44 | 1.67003 | 47.2 | 25.74 |
| 29 | −31.174 | 0.20 | | | 27.10 |
| 30 | 62.452 | 3.88 | 1.50127 | 56.5 | 27.90 |
| 31 | −226.896 | 0.15 | | | 27.80 |
| 32 | 125.628 | 5.71 | 1.50127 | 56.5 | 27.50 |
| 33 | −29.646 | 1.20 | 1.88300 | 40.8 | 27.10 |
| 34 | −1686.338 | 46.64 | | | 27.10 |
| 35 | 57.525 | 7.01 | 1.51633 | 64.1 | 26.90 |
| 36 | −38.749 | 0.47 | | | 23.54 |
| 37 | −69.664 | 1.40 | 1.83400 | 37.2 | 22.69 |
| 38 | 20.495 | 7.23 | 1.48749 | 70.2 | 22.13 |
| 39 | 227.801 | 0.61 | | | 23.38 |
| 40 | 37.446 | 5.48 | 1.50127 | 56.5 | 24.56 |
| 41 | −38.416 | 1.40 | 1.83481 | 42.7 | 24.66 |
| 42 | −103.245 | 0.15 | | | 25.15 |
| 43 | 40.048 | 4.54 | 1.51633 | 64.1 | 25.55 |
| 44 | −97.950 | 4.00 | | | 25.31 |
| 45 | ∞ | 33.00 | 1.60859 | 46.4 | 23.57 |
| 46 | ∞ | 13.20 | 1.51633 | 64.2 | 40.00 |
| 47 | ∞ | (Variable) | | | 40.00 |
| Image plane | ∞ | | | | |

Aspherical Surface data
Fifteenth surface

| | | |
|---|---|---|
| K = −4.98064e+002 | A4 = 3.14859e−005 | A6 = −3.27331e−007 |
| A8 = −1.45370e−009 | A10 = −1.93067e−011 | A12 = 4.84910e−014 |
| A3 = 8.91291e−006 | A5 = 1.87330e−006 | A7 = 9.07873e−010 |
| A9 = 4.49930e−010 | A11 = −8.01597e−013 | |

Various data
Zoom ratio 20.00

| | | | | | |
|---|---|---|---|---|---|
| Focal length | 7.00 | 17.50 | 35.00 | 63.00 | 140.00 |
| F number | 1.90 | 1.90 | 1.90 | 1.90 | 2.43 |
| Field angle | 38.16 | 17.45 | 8.93 | 4.99 | 2.25 |
| Image height | 5.50 | 5.50 | 5.50 | 5.50 | 5.50 |
| Total lens length | 268.86 | 268.86 | 268.86 | 268.86 | 268.86 |
| BF | 38.96 | 38.96 | 38.96 | 38.96 | 38.96 |
| d14 | 0.96 | 21.96 | 31.72 | 37.19 | 41.38 |
| d23 | 40.45 | 15.87 | 5.20 | 2.00 | 7.23 |
| d26 | 8.65 | 12.24 | 13.15 | 10.88 | 1.46 |
| d47 | 5.79 | 5.79 | 5.79 | 5.79 | 5.79 |
| Entrance pupil position | 48.53 | 104.16 | 180.24 | 287.22 | 525.01 |
| Exit pupil position | 84.00 | 84.00 | 84.00 | 84.00 | 84.00 |
| Front principal point position | 56.16 | 125.57 | 230.90 | 400.96 | 915.61 |
| Rear principal point position | −1.21 | −11.71 | −29.21 | −57.21 | −134.21 |

Zoom lens unit data

| Unit | First surface | Focal length | Lens structure length | Front principal point position | Rear principal point position |
|---|---|---|---|---|---|
| 1 | 1 | 53.00 | 60.59 | 36.96 | 4.17 |
| 2 | 15 | −12.16 | 23.72 | 2.53 | −13.62 |
| 3 | 24 | −40.86 | 3.68 | −0.90 | −2.97 |
| 4 | 27 | 149.70 | 142.05 | 236.08 | −325.18 |

Numerical Embodiment 4

Surface data

| Surface number | r | d | nd | vd | Effective diameter |
|---|---|---|---|---|---|
| 1 | −155.833 | 2.20 | 1.80100 | 35.0 | 78.36 |
| 2 | 245.932 | 6.67 | | | 75.10 |
| 3 | 13317.833 | 2.20 | 1.84666 | 23.8 | 73.82 |
| 4 | 112.751 | 12.47 | 1.43875 | 95.0 | 72.35 |
| 5 | −172.062 | 0.15 | | | 72.60 |
| 6 | 396.107 | 9.96 | 1.43387 | 95.1 | 73.22 |
| 7 | −105.572 | 5.39 | | | 73.26 |
| 8 | 114.110 | 9.04 | 1.72916 | 54.7 | 69.30 |
| 9 | −256.562 | 0.15 | | | 68.71 |
| 10 | 54.825 | 6.05 | 1.78800 | 47.4 | 62.45 |
| 11 | 103.504 | (Variable) | | | 61.61 |
| 12 | 51.789 | 1.00 | 1.83481 | 42.7 | 31.55 |
| 13 | 15.910 | 6.61 | | | 24.93 |
| 14 | −400.917 | 6.84 | 1.80809 | 22.8 | 24.62 |
| 15 | −17.072 | 0.75 | 1.83481 | 42.7 | 23.76 |
| 16 | 31.672 | 0.30 | | | 21.17 |
| 17 | 19.845 | 6.28 | 1.60342 | 38.0 | 21.08 |
| 18 | −32.634 | 1.00 | | | 20.28 |
| 19 | −25.408 | 0.75 | 1.83489 | 42.6 | 18.99 |
| 20 | 102.231 | (Variable) | | | 18.28 |
| 21 | −22.336 | 0.75 | 1.75500 | 52.3 | 15.30 |
| 22 | 31.032 | 2.52 | 1.84649 | 23.9 | 16.72 |
| 23 | 470.386 | (Variable) | | | 17.28 |
| 24 (Stop) | ∞ | 1.34 | | | 24.01 |
| 25 | −513.754 | 4.44 | 1.67003 | 47.2 | 24.91 |
| 26 | −29.491 | 0.15 | | | 25.66 |
| 27 | 55.051 | 3.88 | 1.51633 | 64.1 | 26.31 |
| 28 | 186.478 | 0.15 | | | 26.12 |
| 29 | 61.856 | 5.71 | 1.50127 | 56.5 | 26.09 |
| 30 | −32.834 | 1.20 | 1.88300 | 40.8 | 25.82 |
| 31 | −336.685 | (Variable) | | | 25.98 |
| 32 | 55.061 | 6.20 | 1.48749 | 70.2 | 26.60 |
| 33 | −42.524 | 0.15 | | | 26.23 |
| 34 | −106.356 | 1.40 | 1.83400 | 37.2 | 25.37 |
| 35 | 23.054 | 4.74 | 1.51633 | 64.2 | 24.28 |
| 36 | −199.026 | 0.86 | | | 24.30 |
| 37 | 44.732 | 6.26 | 1.51742 | 52.4 | 24.92 |
| 38 | −22.898 | 1.40 | 1.88300 | 40.8 | 24.88 |
| 39 | −243.333 | 0.15 | | | 25.85 |
| 40 | 66.393 | 4.71 | 1.51742 | 52.4 | 26.38 |
| 41 | −36.700 | (Variable) | | | 26.42 |
| 42 | ∞ | 33.00 | 1.60859 | 46.4 | 40.00 |
| 43 | ∞ | 13.20 | 1.51633 | 64.2 | 40.00 |
| 44 | ∞ | (Variable) | | | 40.00 |
| Image plane | ∞ | | | | |

Various data
Zoom ratio 16.85

| | | | | | |
|---|---|---|---|---|---|
| Focal length | 8.00 | 13.61 | 29.55 | 59.74 | 134.79 |
| F number | 1.90 | 1.90 | 1.90 | 1.90 | 2.50 |
| Field angle | 34.51 | 22.00 | 10.54 | 5.26 | 2.34 |
| Image height | 5.50 | 5.50 | 5.50 | 5.50 | 5.50 |
| Total lens length | 250.44 | 250.44 | 250.44 | 250.44 | 250.44 |
| BF | 42.92 | 41.73 | 41.02 | 41.29 | 40.39 |
| d11 | 0.70 | 14.94 | 29.31 | 37.91 | 43.74 |
| d20 | 41.44 | 25.03 | 8.90 | 1.98 | 3.57 |
| d23 | 8.55 | 10.72 | 12.48 | 10.79 | 3.38 |
| d31 | 33.00 | 34.19 | 34.90 | 34.63 | 35.54 |
| d41 | 5.26 | 4.07 | 3.35 | 3.63 | 2.72 |
| d44 | 8.50 | 8.50 | 8.50 | 8.50 | 8.50 |
| Entrance pupil position | 48.74 | 76.75 | 139.36 | 232.64 | 409.07 |
| Exit pupil position | 259.33 | 231.24 | 217.46 | 222.51 | 206.70 |
| Front principal point position | 57.00 | 91.19 | 173.08 | 309.06 | 635.53 |
| Rear principal point position | 0.50 | −5.11 | −21.05 | −51.25 | −126.29 |

Zoom lens unit data

| Unit | First surface | Focal length | Lens structure length | Front principal point position | Rear principal point position |
|---|---|---|---|---|---|
| 1 | 1 | 56.83 | 54.28 | 36.40 | 7.74 |
| 2 | 12 | −14.39 | 23.53 | 5.67 | −8.29 |
| 3 | 21 | −30.56 | 3.27 | 0.06 | −1.72 |
| 4 | 24 | 34.74 | 16.87 | 2.69 | −8.22 |
| 5 | 32 | 47.76 | 25.87 | 12.68 | −6.01 |
| 6 | 42 | ∞ | 46.20 | 14.58 | −14.58 |

TABLE 1

Values corresponding to individual conditional expressions in Numerical Embodiments 1 to 4

| Conditional expression number | Conditional expression | Numerical Embodiment 1 | Numerical Embodiment 2 | Numerical Embodiment 3 | Numerical Embodiment 4 |
|---|---|---|---|---|---|
| (1) | $(\theta pa - \theta na)/(\nu pa - \nu na)$ | $-1.190 \times 10^{-3}$ | $-1.17 \times 10^{-3}$ | $-1.160 \times 10^{-3}$ | $-0.924 \times 10^{-3}$ |
| (2) | $\nu pa - \nu na$ | 47.07 | 50.80 | 41.23 | 43.66 |
| (3) | f1ns/ft | −0.461 | −0.460 | −0.448 | −0.464 |
| (4) | $\nu na$ | 29.90 | 29.84 | 25.90 | 29.38 |
| (5) | f1/ft | 0.410 | 0.410 | 0.379 | 0.422 |
| (6) | Z | 20 | 20 | 20 | 17 |
| (7) | fw/IS | 0.745 | 0.745 | 0.636 | 0.727 |

According to this embodiment described above, it is possible to provide a zoom lens system in which high zoom ratio may easily be realized, a secondary spectrum of the longitudinal chromatic aberration may be appropriately corrected at the telephoto side, and reduction of size and weight may be realized easily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-188463, filed on Aug. 17, 2009, which is hereby incorporated by reference herein in its entirety.

What is claimed is:

1. A zoom lens system, comprising in order of from an object side to an image side:

a first lens unit having a positive refractive power, which does not move for zooming;

a second lens unit having a negative refractive power for a magnification action; and a rear lens group including two or more lens units, wherein the first lens unit includes a first sub lens unit which does not move for focusing and a second sub lens unit which moves for focusing, and the first sub lens unit includes two or more negative lenses and one or more positive lenses; and wherein the following conditional expressions are relative, $-1.193 \times 10^{-3} < (\theta pa - \theta na)/(\nu pa - \nu na) < -0.904 \times 10^{-3}$;

$40 < \nu pa - \nu na < 55$; and $-0.465 < f1ns/ft$, where $\nu na$ and $\theta na$ represent an average Abbe number and an average partial dispersion ratio of materials of the two or more negative lenses included in the first sub lens unit, respectively, $\nu pa$ and $\theta pa$ represent an average Abbe number and an average partial dispersion ratio of materials of the one or more positive lenses included in the first lens unit, respectively, fins represents a combined focal length of the two or more negative lenses included in the first sub lens unit, and ft represents a focal length of the zoom lens system at a telephoto end.

2. A zoom lens system according to claim 1, wherein the average Abbe number ($\nu na$) of the material of the negative lens included in the first sub lens unit satisfies the following condition:

$15.0 < \nu na < 30.3$.

3. A zoom lens system according to claim 1, wherein the following expression is satisfied, $0.350 < f1/ft < 0.425$, when f1 represents a focal length of the first lens unit.

4. A zoom lens system according to claim 1, wherein the following expression is satisfied, $15 < ft/fw$, where fw represents a focal length of the zoom lens system at a wide angle end.

5. A zoom lens system according to claim 1, wherein the rear lens group comprises in order of from the object side to the image side:

a third lens unit having a negative refractive power, which moves on an optical axis in association with a movement of the second lens unit; and a fourth lens unit having a positive refractive power, which does not move for zooming.

6. A zoom lens system according to claim 1, wherein the rear lens group comprises in order of from the object side to the image side:

a third lens unit having a negative refractive power, which moves for zooming;

a fourth lens unit having a positive refractive power, which does not move for zooming; and a fifth lens unit having a positive refractive power, which moves for zooming.

7. An image pickup apparatus, comprising:

the zoom lens system according to any one of claims 1 to 6; and a photoelectric transducer for receiving an optical image formed by the zoom lens system so as to perform photoelectric conversion of the optical image.

8. An image pickup apparatus according to claim 7, wherein the following expression is satisfied, $0.6 < fw/IS$, wherein fw represents a focal length of the zoom lens system at a wide angle end and IS represents a diagonal length of an effective surface of the photoelectric transducer.

* * * * *